(12) United States Patent
Kawamoto et al.

(10) Patent No.: US 7,255,663 B2
(45) Date of Patent: Aug. 14, 2007

(54) STARTING CLUTCH CONTROL APPARATUS

(75) Inventors: Yoshinobu Kawamoto, Fuji (JP); Masaaki Uchida, Fuji (JP); Kenji Nakashima, Fuji (JP)

(73) Assignee: Jatco Ltd (JP)

( * ) Notice: Subject to any disclaimer, the term of this patent is extended or adjusted under 35 U.S.C. 154(b) by 220 days.

(21) Appl. No.: 11/189,212

(22) Filed: Jul. 26, 2005

(65) Prior Publication Data

US 2007/0026993 A1  Feb. 1, 2007

(30) Foreign Application Priority Data

Jul. 26, 2004  (JP) .............................. 2004-216950

(51) Int. Cl.
*B60W 10/02* (2006.01)
(52) U.S. Cl. ........................................ 477/174; 701/67
(58) Field of Classification Search ...................... None
See application file for complete search history.

(56) References Cited

U.S. PATENT DOCUMENTS 5,655,996 A * 8/1997 Ohtsuka ..................... 477/166
5,679,099 A * 10/1997 Kato et al. .................. 477/176
5,766,110 A * 6/1998 Kanno et al. ................. 477/39

* cited by examiner

Primary Examiner—Charles A. Marmor
Assistant Examiner—Derek D. Knight
(74) Attorney, Agent, or Firm—Rossi, Kimms & McDowell LLP

(57) ABSTRACT

There is provided a starting clutch control apparatus which is capable of controlling transmission torque of a starting clutch according to changes in accelerator operated amount without preparing a plurality of data maps of torque coefficients in advance. A clutch controller determines a clutch instruction torque based on torque coefficient, engine speed, and engine speed correction amount, and controls the engagement state of the starting clutch according to the clutch instruction torque. Therefore, it is possible to control the engagement state of the starting clutch in response to sudden operation of an accelerator, and to finely control the degree of engine blow-up according to an accelerator operated amount. Only one data map for determining the torque coefficient according to a rotational speed ratio of a clutch input shaft to a clutch output shaft is required to be stored in a data storage section, and hence it is possible to prevent an increase in the amount of data stored in the data storage section.

7 Claims, 6 Drawing Sheets

STARTING CLUTCH CONTROL APPARATUS

BACKGROUND OF THE INVENTION

1. Field of the Invention

The present invention relates a starting clutch control apparatus which controls torque transmitted by a clutch in starting a vehicle.

2. Description of the Prior Art

Conventionally, a method disclosed in Japanese Patent Application Laid-Open Publication No. S63-305039 has been known as an example of a clutch control method for controlling torque transmitted by a starting clutch which connects or disconnects an engine to or from the shift mechanism of an automatic transmission.

In the starting clutch control method described in this publication, the ratio of rotational speeds of a clutch input shaft and a clutch output shaft of the starting clutch is detected, a torque coefficient C corresponding to the present clutch speed ratio is read out from a data map of torque coefficients C set in advance relative to speed ratios, and a clutch control torque Tcl is calculated based on the torque coefficient C and the present engine speed so as to control torque transmitted by the starting clutch.

In the method in which the starting clutch is controlled using the clutch control torque Tcl calculated as above, only one relationship between the gear ratio of the starting clutch and the capacity coefficient C is set, and hence the clutch control torque Tcl cannot cope with sudden operation of an accelerator.

To address this problem, in a method disclosed in Japanese Patent Application Laid-Open Publication No. H09-72353, accelerator operated amount are divided into three ranges, and a data map of torque coefficients C relative to gear ratios of a starting clutch is prepared in advance for each of the three ranges, a data map of these torque coefficients C is complemented by present accelerator operated amount, and calculate clutch control torque Tcl, so that torque transmitted by the starting clutch can be responsive to e.g. sudden operation of an accelerator.

However, in the method in which the data map of torque coefficients C is prepared for each range of accelerator operated amounts so as to calculate clutch control torque Tcl, torque transmitted by the starting clutch can follow changes in accelerator operated amount, but it is necessary to prepare a plurality of data maps of torque coefficients C in accordance with accelerator operated amounts.

SUMMARY OF THE INVENTION

It is therefore an object of the present invention to provide a starting clutch control apparatus which is capable of controlling torque transmitted by a starting clutch in accordance with changes in accelerator operated amount without the necessity of preparing a plurality of data maps of torque coefficients C.

To attain the above object, there is provided a control apparatus for a starting clutch provided between a driving side and a driven side of a power transmission system of a vehicle, for controlling the engagement state of the driving side and the driven side, comprising an engine speed detecting means for detecting the engine speed, a clutch speed ratio detecting means for detecting the ratio of rotational speeds of the driving side and the driven side of the starting clutch, accelerator operated amount corresponding value detecting means for detecting a value corresponding to an accelerator operated amount, a torque coefficient determining means for detecting a torque coefficient based on the speed ratio detected by the clutch speed ratio detecting means, an engine speed correction amount determining means for determining the engine speed correction amount based on the detected accelerator operated amount corresponding value, a clutch instruction torque determining means for determining a clutch instruction torque for the starting clutch based on the torque coefficient, the engine speed, and the engine speed correction amount, and a clutch controller that controls the engagement state of the starting clutch based on the clutch instruction torque determined by the clutch instruction torque determining means.

According to the present invention, the clutch controller controls the engagement state of the starting clutch based on a clutch instruction torque determined based on torque coefficient, engine speed, and engine speed correction amount, and therefore the starting clutch can achieve the same operational feeling as an automatic transmission which controls the connection between a driving side and a driven side of a power transmission of a vehicle using a fluid coupling (torque converter), and even when an accelerator is suddenly operated, the engagement state of the starting clutch can be controlled in response to the sudden operation.

Moreover, the torque coefficient determining means can determine a torque coefficient according to a speed ratio using one data map without preparing a plurality of data maps in advance, and therefore it is possible to prevent an increase in the amount of data and make matching easier in mounting the control apparatus on a vehicle.

The above and other objects, features, and advantages of the invention will become more apparent from the following detailed description taken in conjunction with the accompanying drawings.

DETAILED DESCRIPTION OF THE PREFERRED EMBODIMENT

The present invention will now be described in detail with reference to the drawings showing a preferred embodiment thereof.

Figure 1:
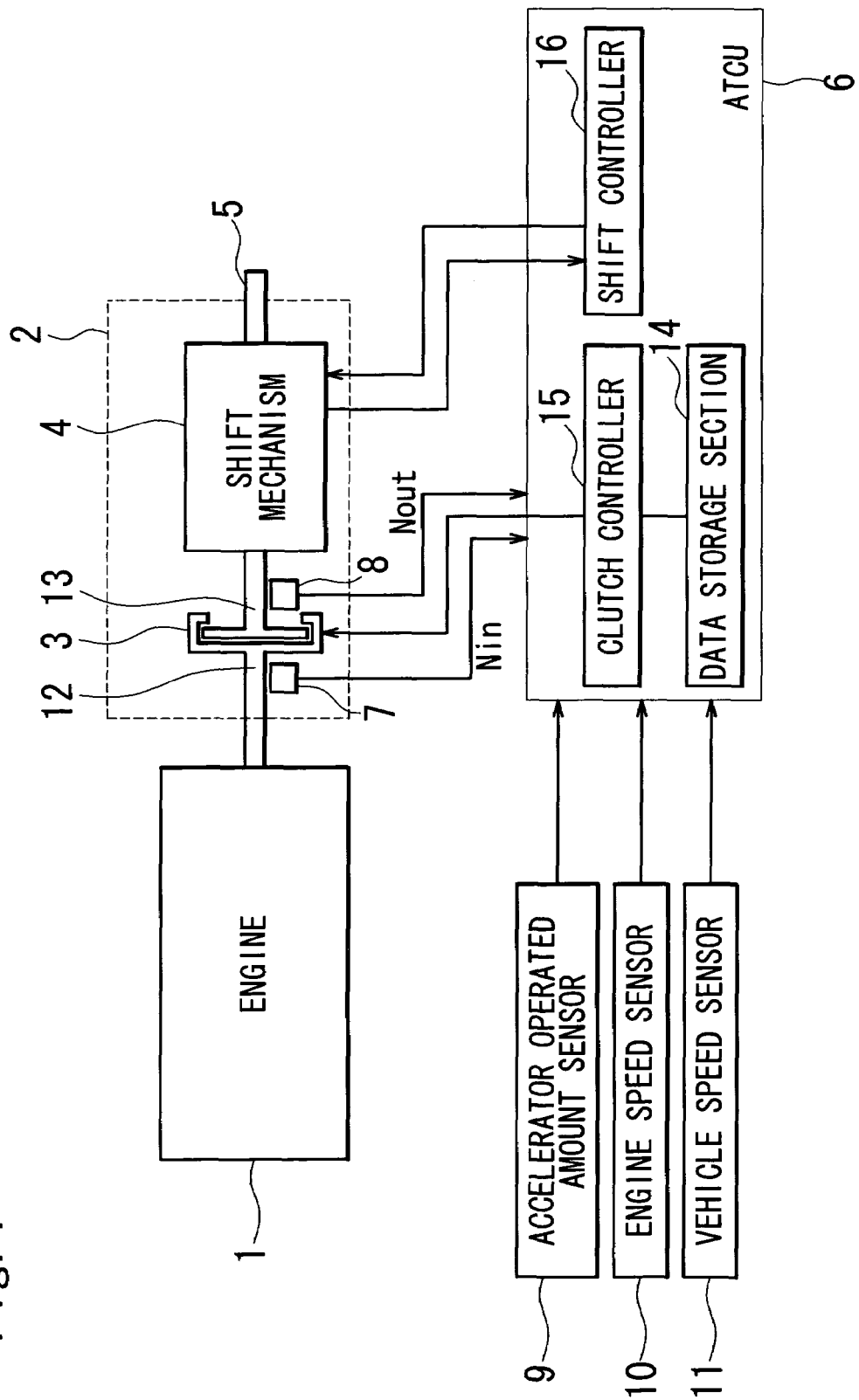
FIG. 1 is a diagram showing an embodiment of the present invention.

FIG. 1 is a diagram showing the overall construction of a vehicle equipped with an automatic transmission provided with a starting clutch.

An engine 1 as a drive source for a vehicle, not shown, is connected to an automatic transmission 2 that converts input rotational force to predetermined revolutions. The converted rotational force is output from an output shaft 5 of the automatic transmission 2 and transmitted to driving wheels, not shown, to drive the vehicle.

The automatic transmission 2 is comprised of a starting clutch 3 which connects or disconnects rotation from the engine 1, a shift mechanism 4 which is connected to an output shaft 13 of the starting clutch 3, for converting revolutions (shift).

A magnet clutch, a wet multiple-disc clutch, a dry clutch, or the like may be used as the starting clutch 3 insofar as its engagement state can be controlled.

Also, a planetary gear type stepped automatic transmission, a belt type continuously variable transmission, a toroidal type continuously variable transmission, or an automatic manual transmission may be used as the shift mechanism 4.

The starting clutch 3 and the shift mechanism 4 are connected to an automatic transmission control unit (hereinafter referred to as "the ATCU") 6.

The ATCU 6 is comprised of a clutch controller 15 which controls the engagement state of the starting clutch 3, and a shift controller 16 which controls the shift carried out by the shift mechanism 4.

The ATCU 6 receives a signal from an input shaft revolution sensor 7 which detects clutch input revolutions (Nin) of a clutch input shaft 12 of the starting clutch 3, and a signal from an output shaft revolution sensor 8 which detest clutch output revolutions (Nout) of a clutch output shaft 13 of the starting clutch 3.

Also, the ATCU 6 receives a signal from an accelerator operated amount sensor 9 which detects the opening $\theta$acc indicative of the accelerator operated amount, a signal from an engine speed sensor 10 which detects the engine speed Ne of the engine 1, and a signal from a vehicle speed sensor 11 which detects the vehicle speed V.

In addition, the engine speed sensor 10 and the input shaft revolution sensor 7 can be used commonly.

According to the received signals, the clutch controller 15 and the shift controller 16 control the engagement and disengagement of the starting clutch 3 and the shift carried out by the shift mechanism 4.

Figure 2:
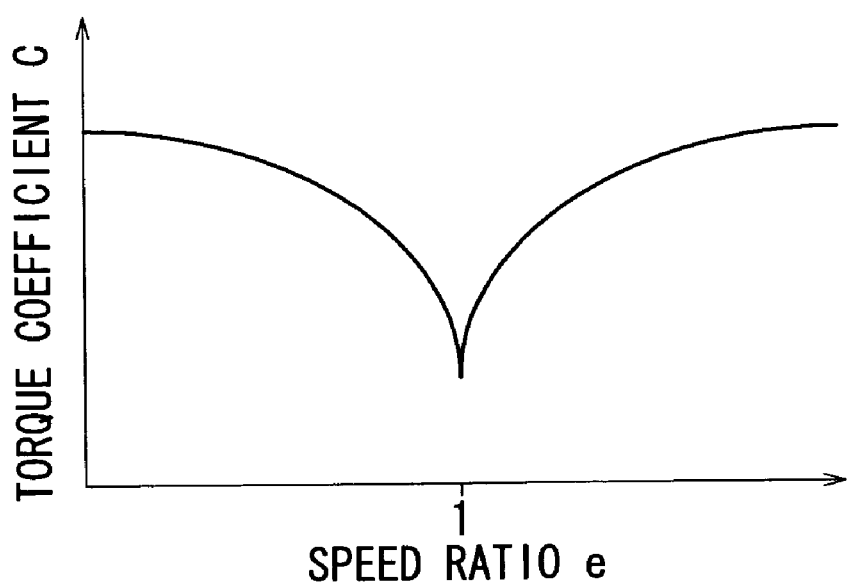
FIG. 2 is a diagram showing the relationship between speed ratio and torque coefficient.
Figure 3:
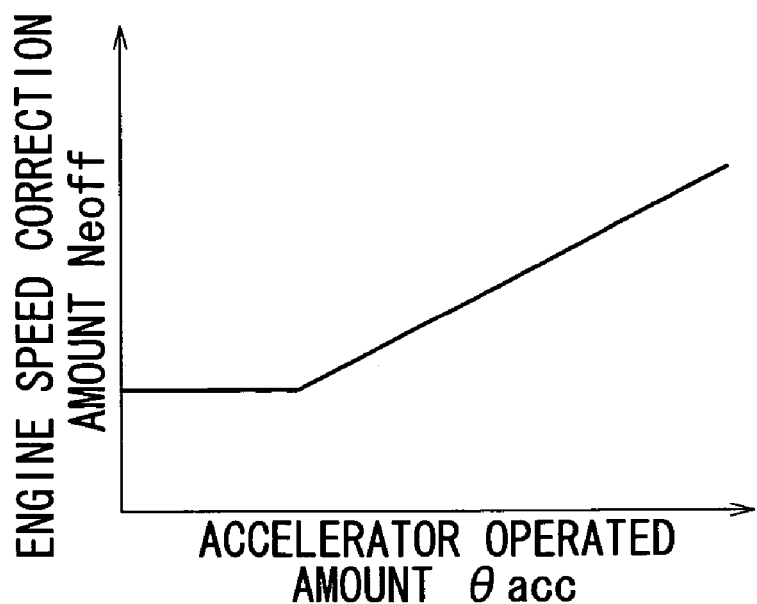
FIG. 3 is a diagram showing the relationship between accelerator operated amount and engine speed correction amount.
Figure 4:
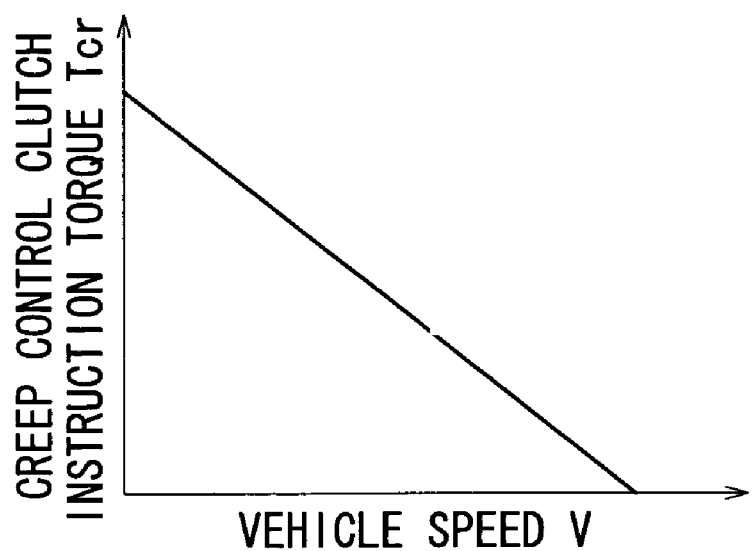
FIG. 4 is a diagram showing the relationship between vehicle speed and creep control clutch instruction torque.

Further, the ATCU 6 is provided with a data storage section 14, which stores a data map showing the relationship between speed ratio e and torque coefficient C as shown in FIG. 2, a data map showing the relationship between accelerator operated amount $\theta$acc and engine speed correction amount Neoff as shown in FIG. 3, and a data map showing the relationship between vehicle speed V and creep control clutch instruction torque Tcr as shown in FIG. 4.

The clutch controller 15 calculates a clutch instruction torque Tcl and converts the same into a hydraulic instruction value so as to control the engagement state of the starting clutch 3.

Figure 5:
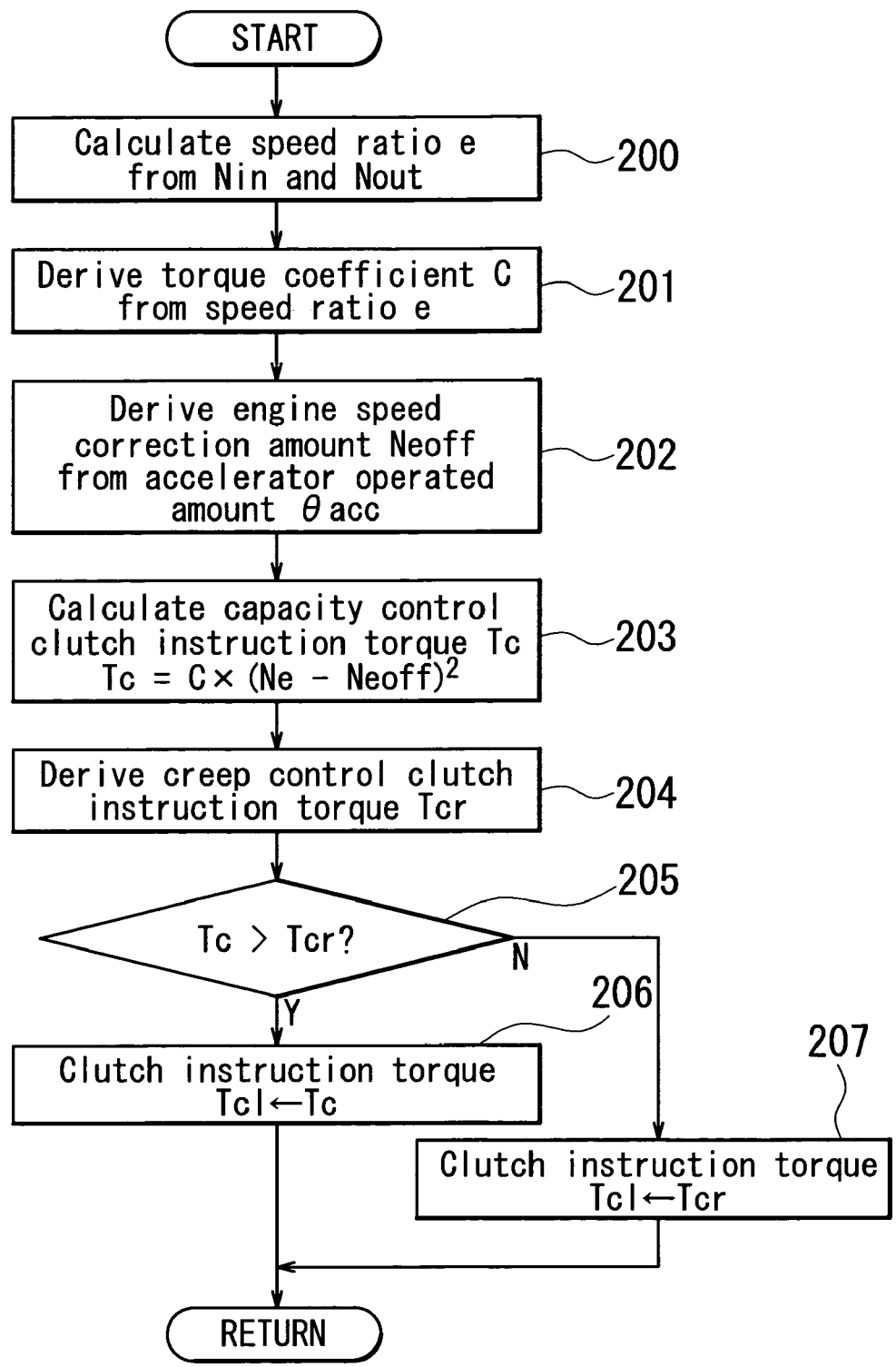
FIG. 5 is a flow chart showing a clutch instruction torque calculating process carried out by a clutch controller.

Referring next to a flow chart of FIG. 5, a description will be given of a process for calculating clutch instruction torque Tcl by the clutch controller 15.

In a step 200, the rotational speed ratio e of the clutch input shaft 12 to the clutch output shaft 13 of the starting clutch 3 is calculated from the clutch input revolutions Nin and the clutch output revolutions Nout detected by the input shaft revolution sensor 7 and the output shaft revolution sensor 8, respectively.

In a step 201, a torque coefficient C is derived from the speed ratio e using the data map showing the relationship between speed ratios e and torque coefficients C stored in the data storage section 14 (see FIG. 2).

The torque coefficient C determines the degree to which the starting clutch 3 slips. Making the torque coefficient C smaller as the speed ratio e becomes closer to 1 can suppress a shock caused by engagement of the starting clutch 3.

In a step 202, using the data map showing the relationship between accelerator operated amount $\theta$acc and engine speed correction amount Neoff stored in the data storage section 14 (see FIG. 3), an engine speed correction amount Neoff is derived from the accelerator operated amount $\theta$acc detected by the accelerator operated amount sensor 9.

The engine speed correction amount Neoff determines a feeling of engine blow-up by offsetting the target engine speed.

Also, when the accelerator operated amount $\theta$acc is small, an engine speed correction amount is determined so as to connect the corrected engine speed with the engine speed for getting the torque capacity of the automatic transmission 2 in creep control smoothly.

In a step 203, a capacity control clutch instruction torque Tc is calculated according to the following expression using the torque coefficient C derived in the step 201, the engine speed Ne detected by the engine speed sensor 10, an the engine speed correction amount Neoff derived in the step 202:

$$Tc = C \times (Ne - Neoff)^2$$

It should be noted that where the value obtained by Ne−Neoff is negative, the value of Ne−Neoff is set to 0 (i.e. the lower limit of Ne−Neoff is set to 0).

In a step 204, using the data map showing the relationship between vehicle speed V and creep control clutch instruction torque Tcr (see FIG. 4), a creep control clutch instruction torque Tcr is derived from the vehicle speed V detected by the vehicle speed sensor 11.

In a step 205, it is determined whether or not the capacity control clutch instruction torque Tc calculated in the step 203 is larger than the creep control clutch instruction torque Tcr derived in the step 204.

If the capacity control clutch instruction torque Tc is larger than the creep control clutch instruction torque Tcr, the process proceeds to a step 206, and if not, the process proceeds to a step 207.

In the step 206, the capacity control clutch instruction torque Tc is calculated as the clutch instruction torque Tcl.

On the other hand, in the step 207, the creep control clutch instruction torque Tcr is calculated as the clutch instruction torque Tcl.

After the calculation of the clutch instruction torque Tcl, the process returns to the step 200 to carry out the above described processing again.

The clutch controller 15 controls the engagement state of the starting clutch 3 according to the calculated clutch instruction torque Tcl.

Figure 6:
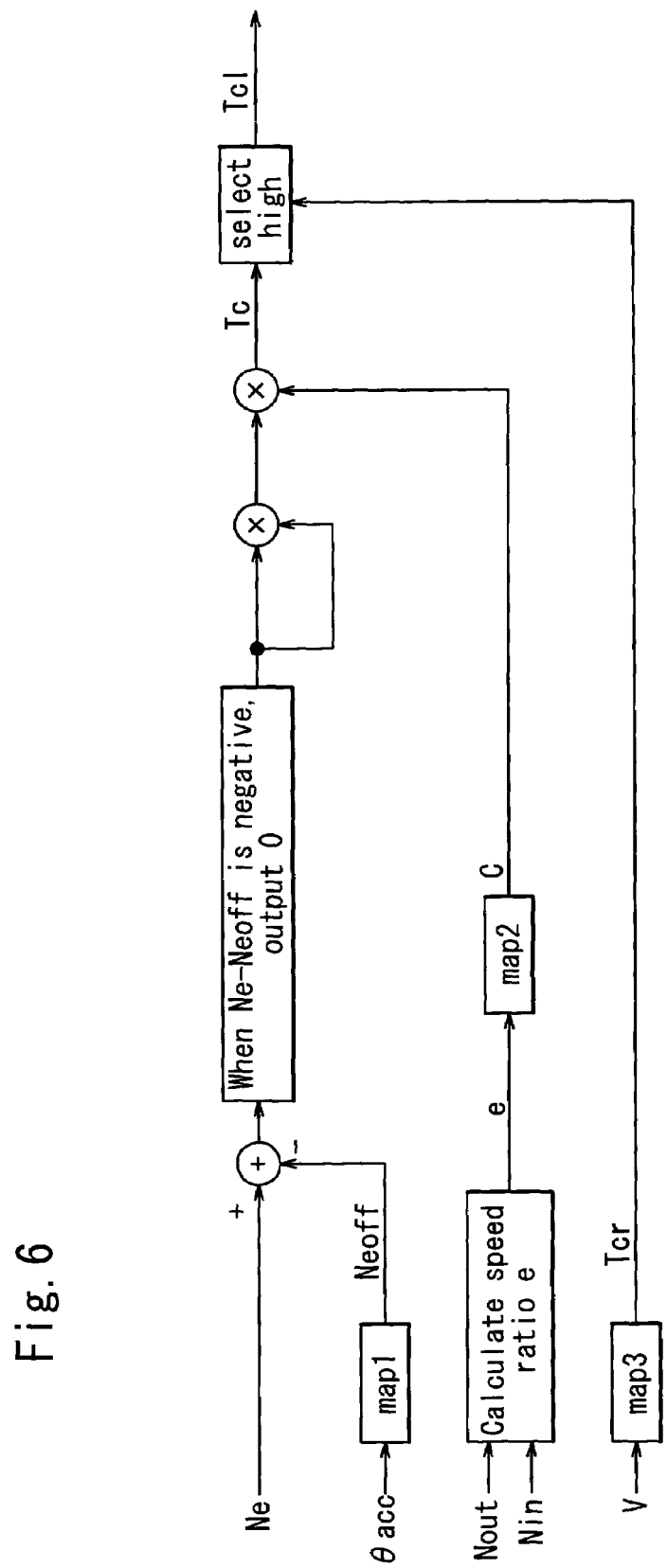
FIG. 6 is a block diagram useful in explaining the clutch instruction torque calculating process.

FIG. 6 is a block diagram visually showing processing performed in the steps 200 to 207.

It should be noted that a map 1 is the data map showing the relationship between accelerator operated amount $\theta$acc and engine speed correction amount Neoff as shown in FIG. 3, a map 2 is the data map showing the relationship between speed ratio e and torque coefficient C as shown in FIG. 2, and a map 3 is the data map showing the relationship between vehicle speed V and creep control clutch instruction torque Tcr as shown in FIG. 4.

In the present embodiment, the engine speed sensor 10 constitutes an engine speed detecting means of the present invention, and the accelerator operated amount sensor 9 constitutes an accelerator operated amount corresponding value detecting means of the present invention. The step 200 constitutes a clutch speed ratio detecting means of the present invention; the step 201, a torque coefficient determining means of the present invention; the step 203, a clutch instruction torque determining means of the present invention; and the step 204, a second clutch instruction torque determining means of the present invention. The vehicle speed sensor 11 constitutes a vehicle speed detecting means of the present invention.

The starting clutch control apparatus according to the present embodiment is constructed as described above; the clutch controller 15 determines a clutch instruction torque Tcl based on a torque coefficient C, engine speed Ne, and engine speed correction amount Neoff, and controls the engagement state of the starting clutch according to the determined clutch instruction torque Tcl.

Therefore, it is possible to control the engaging state of the starting clutch 3 in response to sudden operation of the accelerator while realizing the same operational feeling as an automatic transmission which controls connection of a driving side and a driven side of a power transmission system of a vehicle using a fluid coupling (torque converter), and to accurately control the degree of engine blow-up according to an accelerator operated amount (effects as defined in claims 1, 2, and 3).

Further, since it suffices that only one data map for determining a torque coefficient C according to the ratio of rotational speeds of the clutch input shaft 12 and the clutch output shaft 13 is provided in the data storage section 14, and hence it is possible to prevent an increase in the amount of data stored in the data storage section 14.

Further, it is easy to get hold the image of an engagement state of the starting clutch 3 according to an accelerator operated amount at the start of the vehicle, and to make matching easier when the starting clutch 3 is mounted on the vehicle.

The clutch controller 15 controls the starting clutch 3 according to a larger one of the capacity control clutch Tc (clutch instruction torque) and the creep control clutch instruction torque Tcr (second clutch instruction torque).

Therefore, the clutch controller 15 can set such a clutch torque that a driving force required for starting the vehicle and a driving force required for creep control of the automatic transmission 2 are compatible (an effect defined in claim 4).

What is claimed is:

1. A control apparatus for a starting clutch provided between a driving side and a driven side of a power transmission system of a vehicle, for controlling engagement state of the driving side and the driven side, comprising:
    engine speed detecting means for detecting an engine speed;
    clutch speed ratio detecting means for detecting a ratio of rotational speeds of the driving side and the driven side of the starting clutch;
    accelerator operated amount corresponding value detecting means for detecting a value corresponding to an accelerator operated amount;
    torque coefficient determining means for detecting a torque coefficient based on the speed ratio detected by said clutch speed ratio detecting means;
    engine speed correction amount determining means for determining an engine speed correction amount based on the detected accelerator operated amount corresponding value;
    clutch instruction torque determining means for determining a clutch instruction torque for the starting clutch based on the torque coefficient, the engine speed, and the engine speed correction amount; and
    a clutch controller that controls an engagement state of the starting clutch based on the clutch instruction torque determined by said clutch instruction torque determining means.

2. A control apparatus for a starting clutch according to claim 1, wherein said clutch instruction torque determining means determines the clutch instruction torque according to the following expression:

$$Tc = C \times (Ne - Neoff)^2$$

where the clutch instruction torque is $Tc$, the torque coefficient is $C$, the engine speed is $Ne$, and the engine speed correction amount is Neoff.

3. A control apparatus for a starting clutch according to claim 1, wherein said engine speed correction amount determining means sets the engine speed correction amount to be small when the accelerator operated amount corresponding value is small, and sets the engine speed correction amount to be large when the accelerator operated amount corresponding value is large.

4. A control apparatus for a starting clutch according to claim 1, comprising:
    vehicle speed detecting means for detecting a vehicle speed;
    second clutch instruction torque determining means for determining a second clutch instruction torque for the starting clutch based on the vehicle speed detected by said vehicle speed detecting means;
    wherein said clutch controller controls an engagement state of the starting clutch based on a larger one of the clutch instruction torque determined by said clutch instruction torque determining means and the second clutch instruction torque determined by said second clutch instruction torque determining means.

5. A control apparatus for a starting clutch according to claim 2, wherein said engine speed correction amount determining means sets the engine speed correction amount to be small when the accelerator operated amount corresponding value is small, and sets the engine speed correction amount to be large when the accelerator operated amount corresponding value is large.

6. A control apparatus for a starting clutch according to claim 2, comprising:
    vehicle speed detecting means for detecting a vehicle speed;
    second clutch instruction torque determining means for determining a second clutch instruction torque for the starting clutch based on the vehicle speed detected by said vehicle speed detecting means;
    wherein said clutch controller controls an engagement state of the starting clutch based on a larger one of the clutch instruction torque determined by said clutch instruction torque determining means and the second clutch instruction torque determined by said second clutch instruction torque determining means.

7. A control apparatus for a starting clutch according to claim 3, comprising:
    vehicle speed detecting means for detecting a vehicle speed;
    second clutch instruction torque determining means for determining a second clutch instruction torque for the starting clutch based on the vehicle speed detected by said vehicle speed detecting means;
    wherein said clutch controller controls an engagement state of the starting clutch based on a larger one of the clutch instruction torque determined by said clutch instruction torque determining means and the second clutch instruction torque determined by said second clutch instruction torque determining means.

* * * * *